United States Patent [19]
Williams

[11] Patent Number: 5,153,850
[45] Date of Patent: Oct. 6, 1992

[54] METHOD AND APPARATUS FOR MODIFYING TWO'S COMPLEMENT MULTIPLIER TO PERFORM UNSIGNED MAGNITUDE MULTIPLICATION

[75] Inventor: Marshall Williams, Fremont, Calif.

[73] Assignee: MASS Microsystems, Sunnyvale, Calif.

[21] Appl. No.: 572,743

[22] Filed: Aug. 24, 1990

[51] Int. Cl.⁵ .............................................. G06F 7/52
[52] U.S. Cl. .................................................... 364/757
[58] Field of Search ................. 364/757, 758, 759, 760

[56] References Cited

U.S. PATENT DOCUMENTS

| | | | |
|---|---|---|---|
| 4,761,756 | 8/1988 | Lee et al. | 364/757 |
| 4,823,300 | 4/1989 | Malinowski | 364/757 |
| 4,831,577 | 5/1989 | Wei et al. | 364/757 |
| 4,868,778 | 4/1989 | Disbrow | 364/757 |

OTHER PUBLICATIONS

Booth, Andrew D., "A Signed Binary Multiplication Technique", *Computer Design Development*, pp. 163–166.

Garner, Harvey L., "The Residue Number System", *Computer Design Development*, pp. 181–192.

Dadda, L., "Some Schemes for Parallel Multipliers", *Computer Design Development*, pp. 167–180.

Gosling, John B., "Design of Arithmetic Units for Digital Computers", pp. 22–38.

*Primary Examiner*—David H. Malzahn
*Attorney, Agent, or Firm*—Townsend and Townsend

[57] ABSTRACT

A two's complement multiplier is combined with additional circuit elements and implemented in an integrated circuit to provide a multiplier of selectively operating in two's complement or unsigned magnitude format. To achieve an unsigned magnitude product, the additional circuitry modifies or leaves unchanged the high-order half of the two's complement product as needed. Modification occurs when the most-significant bit of either or both multiplicand signals is a "1". When a multiplicand signal has a most-significant bit of "1", the non-most significant bits of the other multiplicand signal are added to the two's complement product to derive the unsigned magnitude product. Such an implementation results in insignificant speed loss and comparatively minor increase in the required silicon area.

13 Claims, 2 Drawing Sheets

METHOD AND APPARATUS FOR MODIFYING TWO'S COMPLEMENT MULTIPLIER TO PERFORM UNSIGNED MAGNITUDE MULTIPLICATION

BACKGROUND OF THE INVENTION

This invention relates to integrated circuits for performing a two's complement multiplication or an unsigned magnitude multiplication, and more particularly, to a method and apparatus for modifying a two's complement multiplier to also perform unsigned magnitude multiplication.

When implementing logic with integrated circuit (IC) technology, the end use of the circuit often dictates specific speed and size requirements. Accordingly, an implementation providing efficient use of silicon area while achieving the requisite speed requirements is needed. Thus, rather than include both a two's complement multiplier and an unsigned magnitude multiplier on the same IC, a more efficient solution is to include a multiplier which can perform in either format. Such a solution is desireable only if the silicon area required is less than the total area required for the two multipliers individually and the decrease in speed, if any, is within acceptable constraints.

Applications which require both two's complement operations and unsigned magnitude operations include the processing of video signals. Both formats are needed because the luminance component of the video signal is in unsigned magnitude format, while the chrominance components are in two's complement format.

A conventional approach for implementing both a two's complement multiplier and an unsigned magnitude multiplier is to use a larger multiplier than needed. Thus, a nine-bit multiplier would be used for eight-bit applications, thereby providing the capability for both eight-bit two's complement operations and eight-bit unsigned magnitude operations. The use of a larger multiplier, however, has a significant negative impact on the speed of operation and the amount of silicon area required for implementation in an integrated circuit.

Accordingly, there is a need for a multiplier implemented on an integrated circuit which can operate effectively in both two's complement format and unsigned magnitude format with little or no speed loss and minimal increase in silicon area.

SUMMARY OF THE INVENTION

According to the invention, a conventional two's complement multiplier is combined with circuitry which enables the combination to selectively operate according to both the two's complement format and the unsigned magnitude format without significant loss of speed and comparatively small penalty in increased integrated circuit area. For a two's complement multiplier having two multiplicands, signals of n-bits and m-bits and a product signal of n+m bits, where n is greater than or equal to m, it has been found that the low-order m bits of the multiplier product signal are the same regardless of the format. It also has been found that the high-order n bits of the product signal for the two's complement product differ from that for an unsigned magnitude product only if either or both multiplicands have a most significant bit of "1" (e.g., would be considered a negative number according to the two's complement format). Thus, the two's complement product is modified to achieve an unsigned magnitude product only if either or both multiplicands have a most significant bit of "1".

According to one aspect of the invention, if one of the two multiplicands has a most significant bit of "1", then the remaining bits of the other one of the two multiplicands can be added to the high-order n bits of the two's complement product to achieve the high-order n bits of the unsigned magnitude product. Similarly, it has been found that if each one of the two multiplicands has a most significant bit of "1", then the remaining bits of each one of the two multiplicands can be added to the high-order n bits of the two's complement product to achieve the high-order n bits of the unsigned magnitude product. Such a relationship applies for varying multiplicand bit-sizes.

According to another aspect of the invention, the resulting combined multiplier may operate with the same minimum clock cycle relative to that of the conventional two's complement multiplier modified to do both formats.

According to another aspect of the invention, the circuitry added to the conventional two's complement multiplier is of simple complexity resulting in an added silicon area which is small compared to the additional silicon area required by using a larger two's complement multiplier.

DESCRIPTION OF A SPECIFIC EMBODIMENT

According to a specific embodiment of the invention, two's complement multiplier is combined with additional circuitry, enabling selective performance of either two's complement or unsigned magnitude multiplication operations.

Conventional Two's Complement Multiplier

Figure 1:
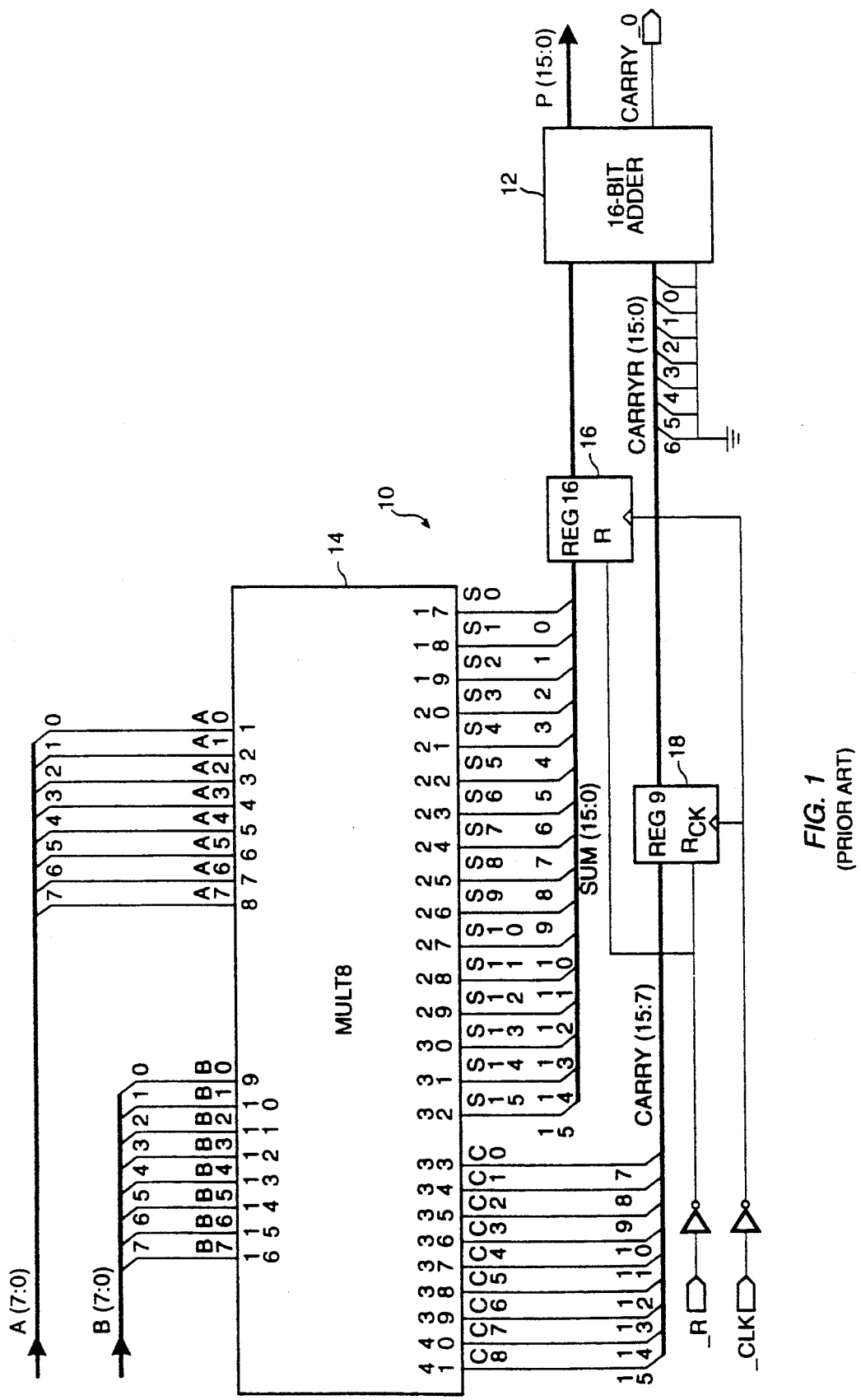
FIG. 1 is a schematic of a conventional eight-bit two's complement multiplier.

Referring to FIG. 1, a conventional eight-bit by eight-bit multiplier 10 configured according to a Booth-algorithm implementation is shown. The multiplier 10 includes several stages of adders. The last stage, adder 12, is shown separate from the previous stages, particularly the MULT8 circuit 14, which is based on a standard library element. The multiplier 10 also includes a nine-bit pipeline register 18 and a sixteen-bit pipeline register 16.

In operation, two eight-bit multiplicands are input to the MULT8 circuit 14 as respective eight-bit digital signals A and B. The signals are multiplied according to the Booth algorithm through several stages of adders formed by the MULT8 circuit 14. To speed up the operation, pipeline registers 16, 18 are used prior to the last stage at adder 12. The sixteen-bit sum signal SUM and the nine-bit carry signal CARRY derived from the previous stages within MULT8 circuit 14 are input to the pipeline registers 16, 18, respectively. These registers 16, 18 receive an inverted clock signal and introduce an intermediate clock cycle to the multiplication process to speed up the total operation time. As a result, the carry and sum signals are pipelined to the sixteen-bit adder 12, which generates a sixteen-bit product signal P and a carry signal CARRY_O.

A typical operation time for performing a multiplication by the multiplier 10 is achieved with a minimum clock cycle of 20 nano-seconds (ns), the operating speed of the MULT8 circuit. During the first clock cycle, the MULT8 circuit operations occur, while during the first 3 to 4 ns of the second clock cycle the adder 12 operation occurs.

Comparison of Two's Complement and Unsigned Magnitude

The input ranges and output ranges for an eight-bit by eight-bit two's complement multiplier having a sixteen-bit product output are shown below in Table A.

TABLE A

| | Two's Complement | |
|---|---|---|
| Decimal | Hexadecimal | Binary |
| Input Range for A and B: | | |
| +127 | 7F | 01111111 |
| . | . | . |
| . | . | . |
| . | . | . |
| 0 | 00 | 00000000 |
| −1 | FF | 11111111 |
| . | . | . |
| . | . | . |
| . | . | . |
| −128 | 80 | 10000000 |
| Output Range for 16-bit Product P: | | |
| +16,384 | 4000 | 0100000000000000 |
| . | . | . |
| . | . | . |
| . | . | . |
| 0 | 0000 | 0000000000000000 |
| −1 | FFFF | 1111111111111111 |
| . | . | . |
| . | . | . |
| . | . | . |
| −16,256 | C080 | 1100000010000000 |

The input ranges and output ranges for an unsigned magnitude eight-bit multiplier having a sixteen-bit product output are shown below in Table B.

TABLE B

| | Unsigned Magnitude | |
|---|---|---|
| Decimal | Hexadecimal | Binary |
| Input Range: | | |
| 255 | FF | 11111111 |
| . | . | . |
| . | . | . |
| . | . | . |
| 128 | 80 | 10000000 |
| 127 | 7F | 01111111 |
| . | . | . |
| . | . | . |
| . | . | . |
| 0 | 00 | 00000000 |
| Output Range: | | |
| 65,025 | FE01 | 1111111000000001 |
| . | . | . |
| . | . | . |
| . | . | . |
| 0 | 0000 | 0000000000000000 |

Comparing the bit formats for two's complement and unsigned magnitude operations, the multiplicands between 0 and 127 (decimal) are handled identically according to either format, whereas multiplicands from 128 to 255 in the unsigned magnitude format represent the multiplicands −128 to −1 in the two's complement format. Thus, to convert from two's complement to unsigned magnitude, only numbers 128 to 256 (unsigned) need be considered, (i.e., only binary numbers in which the most significant bit is "1".)

A comparison of the different products to be generated from the same binary bit pattern according to the respective two's complement and unsigned magnitude formats reveals that in the eight-bit multiplier embodiment the low-order eight bits of the sixteen-bit product is the same for each format. The high-order eight bits, however, are different in some cases. Thus, an apparatus and method for defining the high-order eight bits according to the selection of either the two's complement format or the unsigned magnitude format are needed.

Such relationship has been found to occur for varying sized multipliers (i.e, 16 by 16, 4 by 8, 10 by 10). For multipliers having multiplicand signals which are not equal, the larger bit size (i.e., for a 4 by 8, then eight bits) defines the number of most significant bits which vary in the unsigned magnitude product. Thus, for an n by m multiplier in which n is greater than or equal to m, the most significant n bits generated in the two's complement product need to be modified to define an unsigned magnitude product.

It has been found that the high-order n bits for a two's complement and an unsigned magnitude multiplication vary only if either or both multiplicands have a most significant bit of "1" (e.g., would be considered a negative number according to the two's complement format). Thus, the two's complement product is modified to achieve an unsigned magnitude product only if either or both multiplicands have a most significant bit of "1". It has been found that if one of the two multiplicands has a most significant bit of "1", then the remaining bits (i.e., seven least significant bits) of the other one of the two multiplicands can be added to the high-order n bits of the two's complement product to achieve the high-order n bits for the unsigned magnitude product. Similarly, it has been found that if each one of the two multiplicands has a most significant bit of "1", then the remaining bits of each one of the two multiplicands (i.e., seven least significant bits) can be added to the high-order n bits of the two's complement product to achieve the high-order n bits of the unsigned magnitude product.

Figure 2:
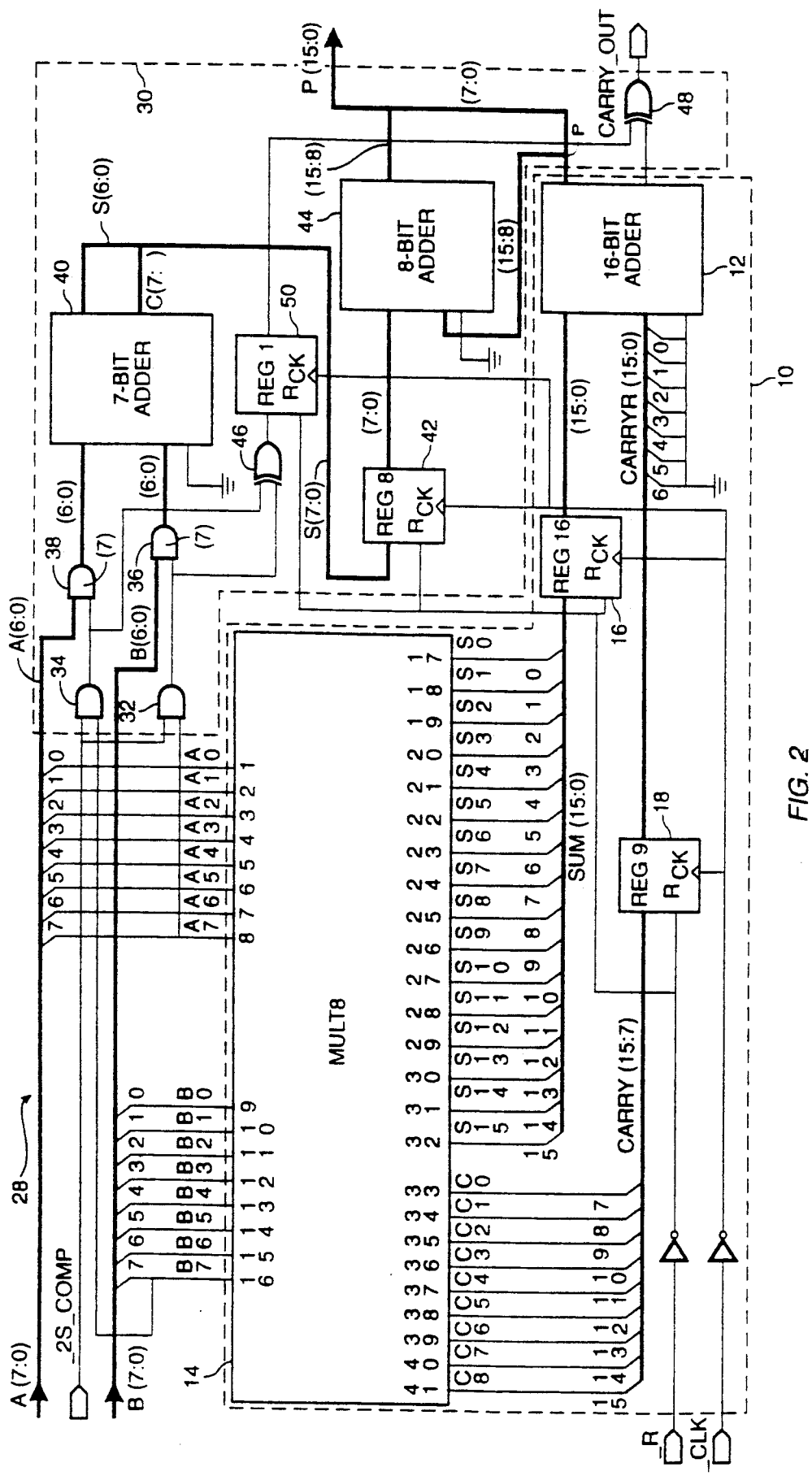
FIG. 2 is a schematic of the multiplier of FIG. 1 modified according to an embodiment of this invention to also function as an unsigned magnitude multiplier.

Modified Multiplier For Performing Two's Complement and Unsigned Magnitude Operations Referring to FIG. 2, the two's complement multiplier 10 of FIG. 1 is shown combined with additional circuitry 30 to form the modified multiplier 28 according to a specific embodiment of this invention. The multiplier 28 enables selective operation in either two's complement or unsigned magnitude format. Two multiplicand signals A and B are input to the multiplier 28, along with a format selection signal. According to this embodiment, a selection signal state of "0" corresponds to two's complement format, while a selection signal state of "1" corresponds to unsigned magnitude format. The product of signals A and B is derived and output as product signal P'.

The two's complement multiplier portion 10 of multiplier 28 operates as described above with regard to FIG. 1, receiving the multiplicand signals A and B and deriving a two's complement product signal P. The high-order byte of the product signal P is input to the additional circuitry 30 where it is modified or left unchanged, depending on the states of the format selection signal 52 and the most significant bit of each of the two multiplicand signals.

The additional circuitry 30 includes AND gates 32, 34, 36, 38, seven-bit adder 40, pipeline register 42, 50, eight-bit adder 44, and exclusive OR gates 46, 48. The AND gates 32, 34, 36, 38 provide logic for determining when a modification of the high-order byte of the two's complement product signal P is needed. The AND gates 32, 34 each have two inputs. At a first input of each of AND gates 32 and 34, the selection signal is received. The second inputs receive the most significant bit of the multiplicand signals A and B, respectively. Thus, the second input of AND gate 32 receives the most significant bit of the multiplicand signal A, while the second input of AND gate 34 receives the most significant bit of the multiplicand signal B.

If the selection signal is low, two's complement format is selected, and no modification of the product signal is needed. Accordingly, the output of each AND gate 32, 34 is low, precluding any operation on the high-order byte of the two's complement product signal P.

It is when the selection signal is high (e.g., unsigned magnitude format selected) and either or both of the signals A and B have a most significant bit of "1" that an operation on the high-order byte of the product signal P is needed. Accordingly, the output of either or both AND gates 32, 34 is high only in such cases.

The next stage of AND gates, namely, gates 36, 38, channel the lower-order seven bits of a multiplicand signal to the adder 40 when the respective output of the AND gate 32, 34 coupled to such AND gates 36, 38 is active. There are seven AND gates 36, each receiving the output of the AND gate 32 (which received the multiplicand signal A MSB) at one input and a respective one of the seven least significant bits of the multiplicand signal B. Similarly, there are seven AND gates 38, each receiving the output of AND gate 34 (which received the multiplicand signal B MSB) at one input and a respective one of the seven least significant bits of the multiplicand signal A.

When the output of AND gate 32 is active, the non-most-significant bits of multiplicand signal B are input to the seven-bit adder 40 as the outputs of the respective AND gates 36. Similarly, when the output of AND gate 34 is active, the non-most-significant bits of multiplicand signal A are input to the seven-bit adder 40 as the outputs of the respective AND gates 38. Therefore, for an unsigned magnitude operation, the non-most-significant bits of multiplicand signal B are input to adder 40 when the most significant bit of multiplicand signal A is "1". Similarly, the non-most-significant bits of multiplicand signal A are input to adder 40 when the most significant bit of multiplcand signal B is "1".

The sum derived by the adder 40, along with any carry-out, if applicable, is input to register 42 where it is pipelined to the eight-bit adder 44. The pipeline register 42 performs a similar function as the pipeline registers 16, 18. Thus, the pipeline register 42 inserts in intermediate clock cycle to speed up the operation of the circuitry 30. The sum from adder 40 pipelined to the eight-bit adder 44 is combined at adder 44 with the high-order byte of the two's complement product signal P, to derive the high-order byte of the final output product signal P'.

During a two's complement operation, the output from adder 40 pipelined to adder 44 is zero so as not to modify the high-order byte of the product signal P. In such case, the signal P' is equal to the signal P. During an unsigned magnitude operation, the output from the adder 40 pipelined to the adder 44 may be non-zero so as to modify the high-order byte of the product signal P. In such case, the signal P' is not equal to the two's complement product signal P, but instead is a modified signal corresponding to the unsigned magnitude product.

To derive a carry signal for the modified multiplier 28 which is accurate for the selected format, exclusive OR gates 46, 48 and the one-bit pipeline register 50 are included in the circuitry 30. The function of the carry signal for the two's complement multiplier 10 is to identify the polarity of the product (e.g., positive number or negative number). Thus, the carry output from the sixteen-bit adder 12 is passed through as the carry signal of the multiplier 28 (e.g., CARRY_OUT) during a two's complement operation.

To pass the sixteen-bit adder 12 carry signal as the CARRY_OUT signal, the input to exclusive OR gate 48 from one-bit pipeline register 50 must be "0" (inactive) during a two's complement operation. As the outputs of AND gates 32, 34 are "0" when two's complement format is selected, the inputs to the exclusive OR gate 46 are "0". Accordingly, the input and output of register 50 is "0" causing the input of the exclusive OR gate 48 to be "0". As a result, the output state of the exclusive OR gate 48 is defined by the state of the carry signal output from the sixteen-bit adder 12.

The CARRY_OUT signal according to the specific embodiment of FIG. 2 also functions to define the polarity of the product for an unsigned magnitude operation. Thus, the CARRY_OUT signal for an unsigned magnitude operation always reflects a positive number for non-zero products. Thus, the CARRY_OUT signal may need to be modified when the unsigned magnitude format is elected.

When the unsigned magnitude format is selected, the states of the most significant bit of each one of the two multiplicand signals A and B correspond to the states of the respective inputs to the exclusive OR gate 46. When the respective most significant bits are both "0", the exclusive OR gate 46 output is zero and the register 50 output is "0". Thus, one input to exclusive OR gate 48 is "0". For such multiplicand signals, the multiplier 10 portion considers each one of the two multiplicands to be a positive number, resulting in a polarity signifying a positive product. Accordingly, the carry output of the sixteen-bit adder 12 is a "0" (e.g., positive). Thus, the inputs to the exclusive OR gate 48 are both "0", causing the CARRY OUT signal to be "0" (e.g., positive).

When the states of the most significant bits of each one of the two multiplicand signals A and B are "1", the states of the inputs of the exclusive OR gate 46 also are both "1". Accordingly, the output of the exclusive OR gate 46 and register 50 are both "0". Thus, one input to exclusive OR gate 48 is "0". For such multiplicand signals, the multiplier 10 portion considers each one of the two multiplicands to be a negative number, resulting in a polarity signifying a positive product. Accordingly, the carry output of the sixteen-bit adder 12 is a "0" (e.g., positive). Thus, the inputs to the exclusive OR gate 48 are both "0", causing the CARRY_OUT signal to be "0" (e.g., positive).

When the states of the most significant bits of each one of the two multiplicand signals A and B are opposite (e.g., one bit is "1", while the other bit is "0"), the state of one input to the exclusive OR gate 46 is "1", while the state of the other input is "0". Accordingly, the outputs of the exclusive OR gate 46 and register 50 are "1". Thus, one input to exclusive OR gate 48 is "1". For such multiplicand signals, the multiplier 10 portion considers one of the multiplicands to be a negative number and the other to be a positive number, resulting in a polarity signifying a negative product. Accordingly, the carry output of sixteen-bit adder 12 is a "1" (e.g., negative). Thus, both inputs to the exclusive OR gate 48 are "1", causing the CARRY_OUT signal to be "0" (e.g., positive). Thus, in all cases in which unsigned magnitude format is selected the output of the exclusive OR gate 48 is "0", indicating a positive product.

Relative Performance

The relative performance of the multiplier 28 according to the invention is described with respect to speed and integrated circuit silicon area. With regard to speed, the multiplier 28 may execute at the same minimum 20 ns clock cycle as the two's complement portion 10 alone. Relative to a minimum clock cycle of approximately 24 ns for a nine-bit multiplier of the same design as multiplier 10, the modified multiplier 28 provides a faster, more effective solution.

With regard to sizing requirements, the additional silicon area needed for implementation on an integrated circuit of the modified multiplier 28 as compared to going to a larger multiplier (i.e., nine-bit multiplier) is insignificant. The approximate area required for the eight-bit two's complement multiplier 10 is approximately 800 mils$^2$. The approximate area for the modified multiplier 28 is approximately 825 mils$^2$. The approximate area for a nine-bit multiplier of the same design as the multiplier 10 would be approximately 1044 mils$^2$. Relative to the two's complement multiplier 10, the increase in silicon area needed to implement the multiplier 28 is approximately 25 mils$^2$, while the increase in silicon area to implement a conventional nine-bit multiplier is approximately 244 mils$^2$. Accordingly, the multiplier 28 according to this invention provides a more efficient use of integrated circuit area with a comparatively insignificant silicon area penalty.

Although a preferred embodiment of the invention has been illustrated and described, various alternatives, modifications and equivalents may be used. For example, although an eight-bit multiplier embodiment has been illustrated and described in detail, multiplier embodiments having other bit ratings also are applicable. Therefore, the foregoing description should not be taken as limiting the scope of the inventions which are defined by the appended claims.

What is claimed is:

1. A method implemented in an integrated circuit including a two's complement multiplier for selectively operating said two's complement multiplier as an unsigned magnitude multiplier of the same bit rating, the two's complement multiplier receiving a first multiplicand signal of n bits, the n bits comprising a most significant bit and n−1 lower bits, and a second multiplicand signal of m bits, the m bits comprising a most significant bit and m−1 lower bits, and the two's complement multiplier generating a two's complement product signal of n+m bits, where n and m are integers and n is greater than or equal to m, the method comprising the steps of:

detecting whether any one of the first and second multiplicand signals represents a negative number according to a two's complement format; and adding for an unsigned magnitude operation with circuitry implemented in an integrated circuit, when said first multiplicand signal is detected as a negative number, the lower bits of the second multiplicand signal to the high-order m bits of the two's complement multiplier product signal, and when said second multiplicand signal is detected as a negative number, the lower bits of the first multiplicand signal to the high-order n bits of the two's complement multiplier product signal.

2. The method of claim 1 wherein said adding step comprises, when both said first and second multiplicand signals are detected as negative numbers:

left aligning the m−1 lower bits of the second multiplicand signal with the m−1 high-order bits of the n−1 lower bits of the first multiplicand signal;

adding of the left-aligned lower bits of the first multiplicand signal and the left-aligned lower bits of the second multiplicand signals to achieve a summing signal, then adding said summing signal to said high-order n bits of the two's complement multiplier product signal to yield the high-order n bits of an unsigned-magnitude product signal.

3. The method of claim 1, wherein the step of left-aligning comprises the step of appending n minus m zeros as least significant bits to the second multiplicand signal, whereby said first and second multiplicand signals added in said adding step each comprise n bits.

4. An apparatus implemented in an integrated circuit including a two's complement multiplier for selectively operating said two's complement multiplier as an unsigned magnitude multiplier of the same bit rating, the two's complement multiplier for receiving a first multiplicand signal of n bits, the n bits comprising a most significant bit and n−1 lower bits, and a second multiplicand signal of m bits, the m bits comprising a most significant bit and m−1 lower bits, and for generating a two's complement product signal of m+m bits, where n and m are integers and n is greater than or equal to m, the apparatus comprising:

means coupled to receive each of said first and second multiplicand signals, for detecting whether either one of the first and second multiplicand signals represents a negative number according to a two's complement format; and adding means coupled to receive the high order n bits of the product of the two's complement multiplier, for an unsigned magnitude operation with circuitry implemented in an integrated circuit, for adding the lower bits of the second multiplicand signal to the high-order m bits of the two's complement multiplier product signal when said first multiplicand signal is detected as a negative number, and for adding the lower bits of the first multiplicand signal to the high-order n bits of the two's complement multiplier product signal when said second multiplicand signal is detected as a negative number.

5. The apparatus of claim 4 wherein said adding means comprises:

means for left aligning the m−1 lower bits of the second multiplicand signal with the m−1 high-order bits of the n−1 lower bits of the first multiplicand signal;

means for adding together the left-aligned lower bits of said first multiplicand signal and the left-aligned lower bits of said second multiplicand signal to yield a summing signal when both said first and second multiplicand signals are detected as negative numbers; and means for summing said summing signal and said high-order n bits of the two's complement multiplier product signal to achieve the high-order n bits of an unsigned-magnitude product signal, when both said first and second multiplicand signals are detected as negative numbers.

6. The apparatus of claim 4 wherein the two's complement multiplier further includes means for generating, in response to said first and second multiplicand signals, a first carry-output signal, and further comprising means for modifying said carry-output signal to designate a positive number for an unsigned magnitude multiplication.

7. A method implemented in an integrated circuit including a two's complement multiplier for selectively operating said two's complement multiplier as an unsigned magnitude multiplier of the same bit rating, the two's complement multiplier receiving a first multiplicand signal of n bits, comprising a most significant bit and n−1 lower bits, and a second multiplicand signal of n bits, comprising a most significant bit and n−1 lower bits, and the two's complement multiplier generating a two's complement product signal of n+n bits, where n is an integer, the method comprising the steps of:

detecting whether any one of the first and second multiplicand signals represents a negative number according to a two's complement format;

adding for an unsigned magnitude operation with circuitry implemented in an integrated circuit, when said first multiplicand signal is detected as a negative number, the lower bits of the second multiplicand signal to the high-order n bits of the two's complement multiplier product signal, and when said second multiplicand signal is detected as a negative number, the lower bits of the first multiplicand signal to the high-order n bits of the two's complement multiplier product signal.

8. The method of claim 7 wherein said adding step comprises, when both said first and second multiplicand signals are detected as negative numbers, adding of the lower bits of said first multiplicand signal and the lower bits of said second multiplicand signals to achieve a summing signal, then summing said summing signal and the high-order n bits of the two's complement multiplier product signal to yield the high-order n bits of an unsigned-magnitude product signal.

9. The method of claim 7, wherein n is eight.

10. An apparatus implemented in an integrated circuit including a two's complement multiplier for selectively operating said two's complement multiplier as an unsigned magnitude multiplier of the same bit rating, the two's complement multiplier for receiving a first multiplicand signal of n bits, the n bits comprising a most significant bit and n−1 lower bits, and a second multiplicand signal of n bits, the n bits comprising a most significant bit and n−1 lower bits, and for generating a two's complement product signal of n+n bits, the apparatus comprising:

means coupled to receive each of said first and second multiplicand signals for detecting whether either one of the first and second multiplicand signals represents a negative number according to a two's complement format; and adding means coupled to receive the high order n bits of the product of the two's complement multiplier, for an unsigned magnitude operation with circuitry implemented in an integrated circuit, for adding the lower bits of the second multiplicand signal to the high-order n bits of the two's complement multiplier product signal when said first multiplicand signal is detected as a negative number, and for adding the lower bits of the first multiplicand signal to the high-order n bits of the two's complement multiplier product signal when said second multiplicand signal is detected as a negative number.

11. The apparatus of claim 10 wherein said adding means comprises:

means for adding together the lower bits of said first multiplicand signal and the lower bits of said second multiplicand signal to yield a summing signal when both said first and second multiplicand signals are detected as negative numbers; and means for adding said summing signal and said high-order n bits of the two's complement multiplier product signal to achieve the high-order n bits of an unsigned-magnitude product signal when both said first and second multiplicand signals are detected as negative numbers.

12. The apparatus of claim 10 wherein the two's complement multiplier further includes means for generating, in response to said first and second multiplicand signals, a first carry-output signal, and further comprising means for modifying said carry-output signal to designate a positive number for an unsigned magnitude multiplication.

13. The apparatus of claim 10 wherein n is eight.

* * * * *